Figure 5:
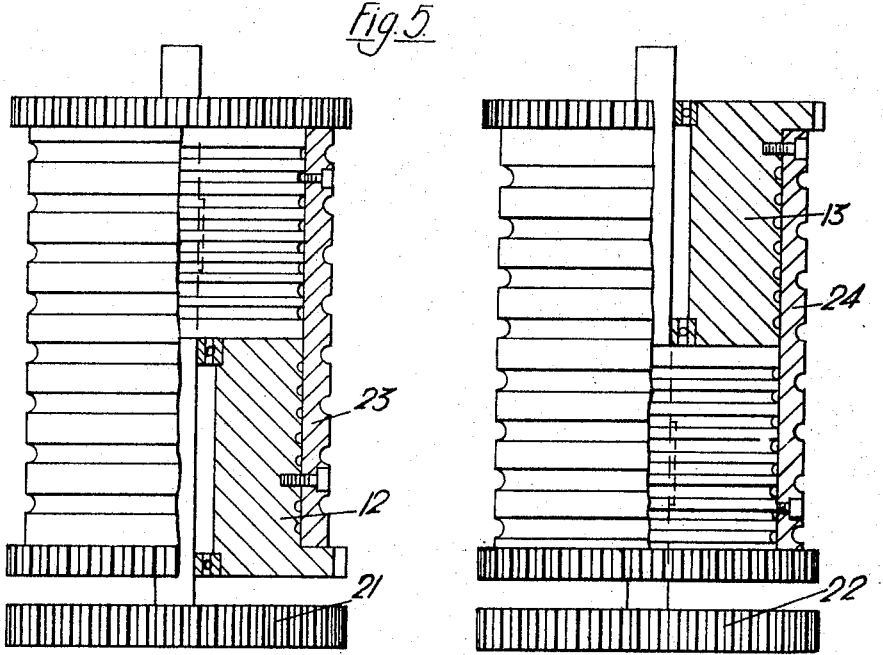

Feb. 28, 1967  W. BETTA  3,306,580
STRINGING OF CONDUCTORS
Filed Nov. 19, 1964  5 Sheets-Sheet 1
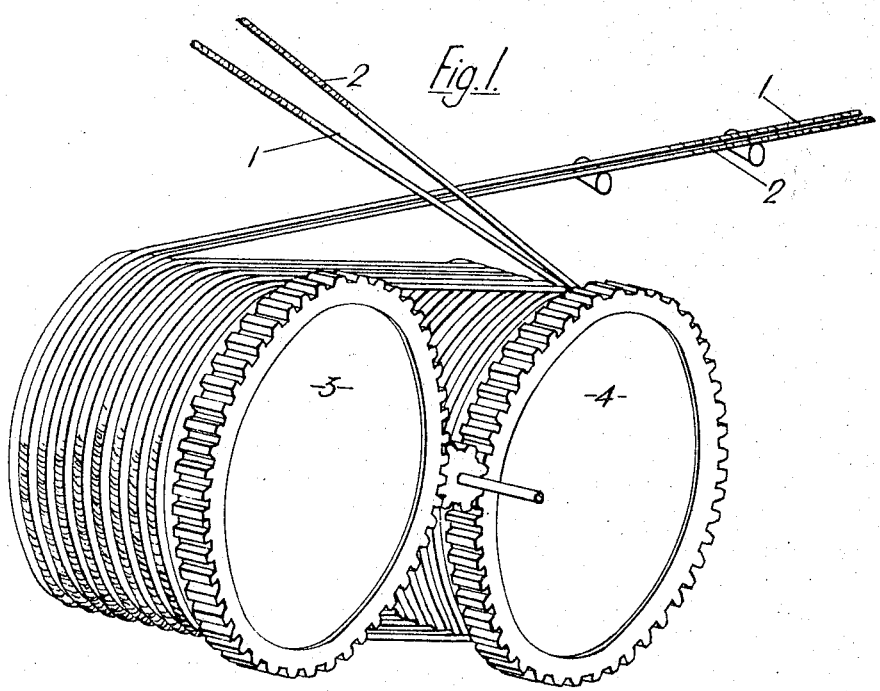
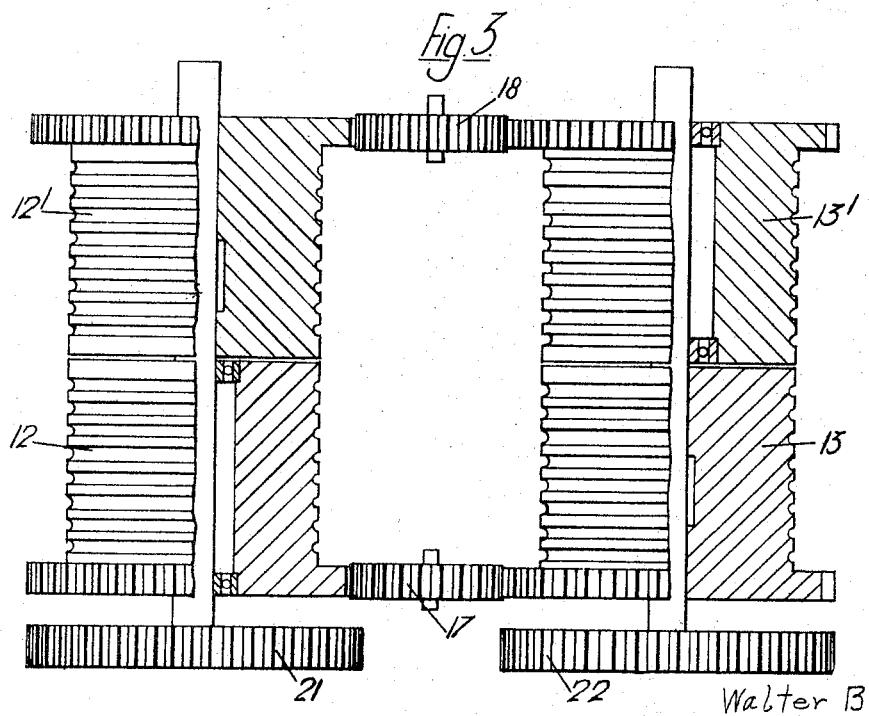
Inventor
Walter Betta
By
Stevens, Davis, Miller & Mosher Attorneys

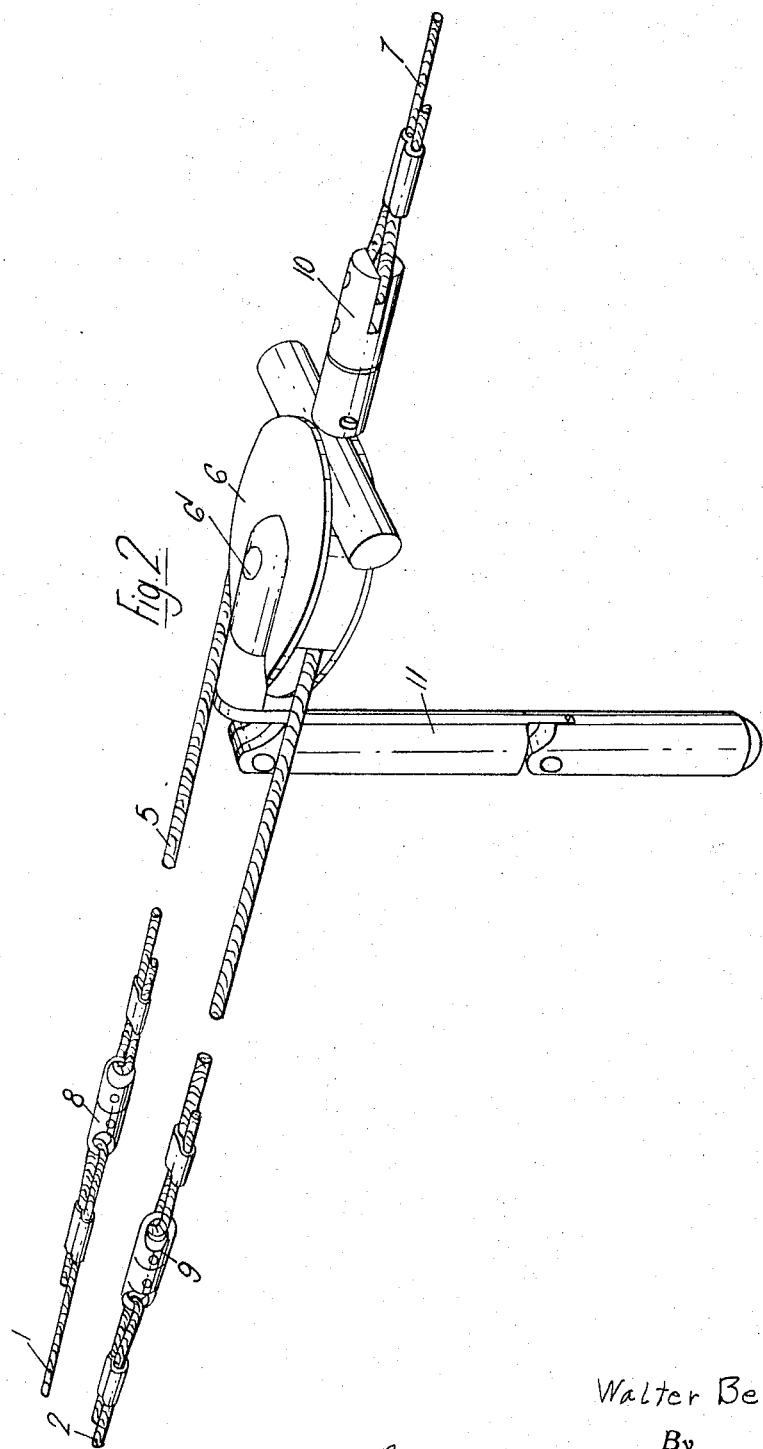

Feb. 28, 1967   W. BETTA   3,306,580
STRINGING OF CONDUCTORS
Filed Nov. 19, 1964   5 Sheets-Sheet 3

Inventor
Walter Betta
By Stevens, Davis, Miller & Mosher
Attorneys

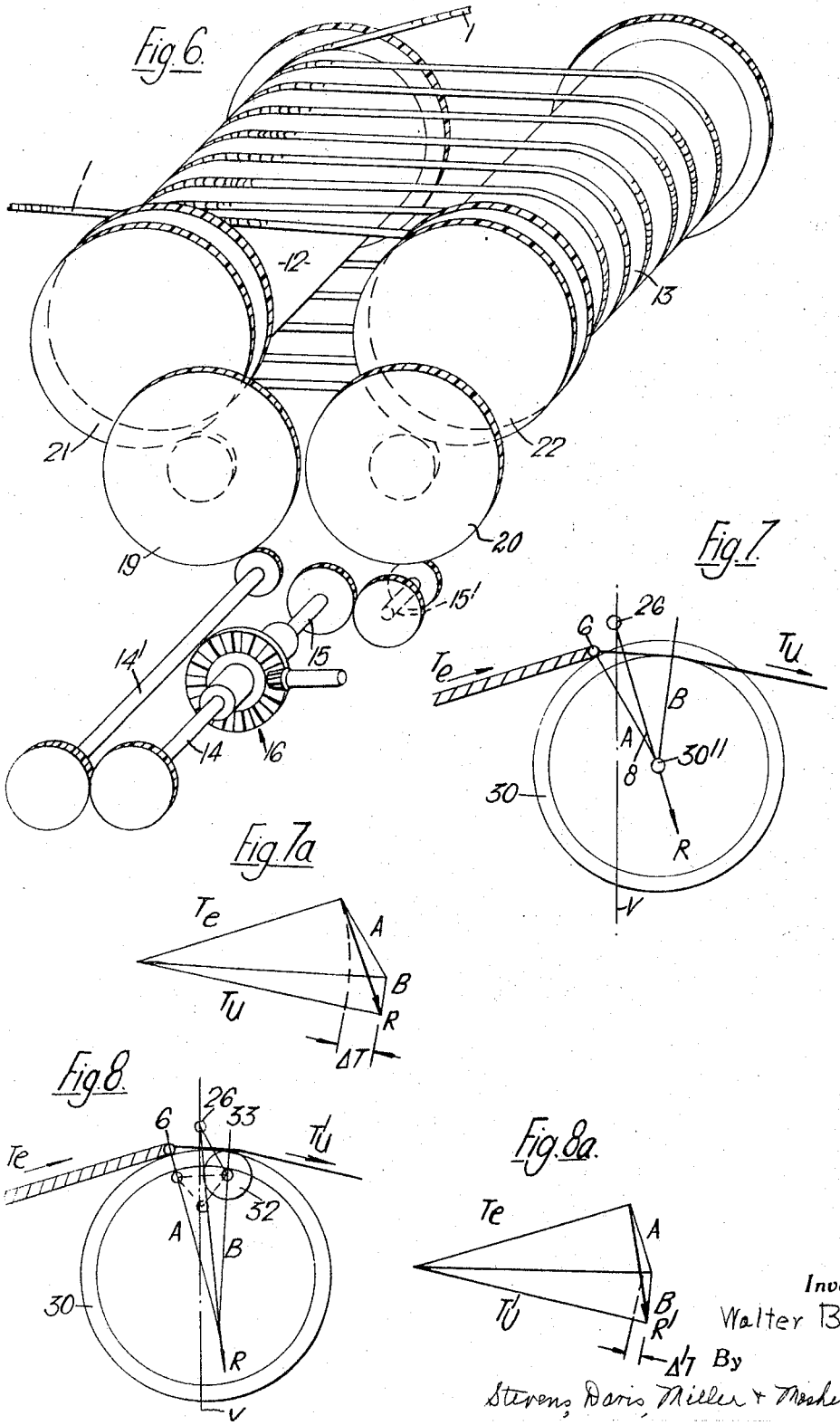

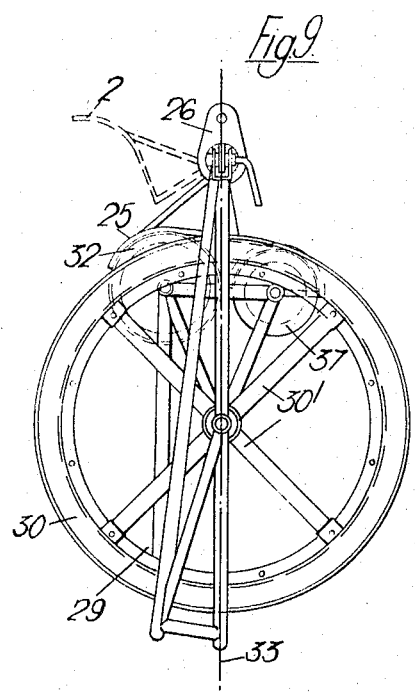
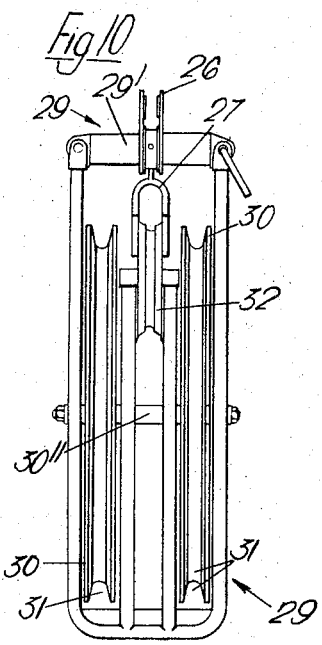
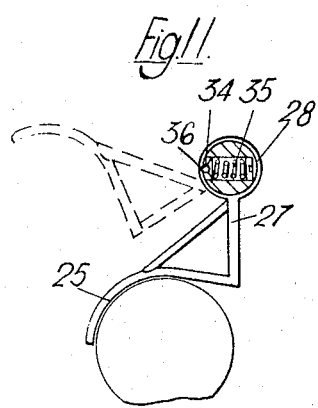
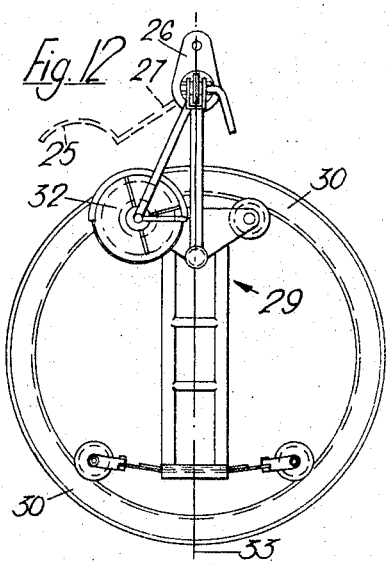
Inventor
Walter Betta

__United States Patent Office__ 3,306,580
Patented Feb. 28, 1967

3,306,580
STRINGING OF CONDUCTORS
Walter Betta, Milan, Italy, assignor to C. R. F. Officine
Meccaniche di Precisions S.p.A., Milan, Italy
Filed Nov. 19, 1964, Ser. No. 412,508
Claims priority, application Italy, Nov. 19, 1963,
23,634/63
11 Claims. (Cl. 254—134.3)

The frequent use of bundles of conductors in the construction of aerial high tension lines has suggested to various constructors the study of particular methods of stretching adapted to reduce the time and cost of putting the conductors in operation. The methods tried up to now have provided for the simultaneous stringing of twin conductors by using a single tensioning cable. Some constructors have carried this method into effect by connecting the two conductors to the tensioning cable by means of a triangular yoke.

With this solution, whilst the winch may be of conventional type the braking assembly necessarily has to be duplicated so that the tension in the conductors can be kept uniform.

Inevitably, with this arrangement the braking mechanism is complicated and can be used to its full extent only for the stretching of twin conductors.

The principal object of the present invention is to provide, for the construction of a mechanism for use in stringing operations, whether for single or twin conductors, or more generally in bundles, an equipment which can be so adapted for the purpose at any time that it is always capable of operating at full capacity, thus avoiding a situation in which the equipment is not fully utilized.

According to the present invention stringing is effected by means of at least one tensioning cable connected at one end to a winch having at least two drums with at least one winding roller and connected at its other end to the free end of the conductors, or of the single conductor, to be stretched, which unwinds from a supply spool and passes via a braking assembly also having two drums. Such a procedure is characterized in that the equalization of tension between the conductors of the bundle is obtained with the aid of means associated with the tensioning assembly constituted by the winch and the tensioning cable.

The proposed method has been particularly studied with the object of effecting the most rational utilization of the equipment. As will be described below, the equipment may be employed:

(a) For the simultaneous stretching of two twin conductors by two tensioning cables;
(b) For the simultaneous stretching of two conductors with one or two tensioning cables;
(c) For the stretching of a single conductor.

In all these cases the equipment can be utilized to its full capacity.

An equipment that enables the method according to the invention to be carried into effect comprises a tensioning assembly formed by at least one tensioning cable and by a winch having at least two drums for winding the tensioning cable and supply it onto a wind-on roller, and a braking assembly, also having two drums, on which the conductor winds upon leaving one of the supply spools.

For the stringing of two conductors with a single tensioning cable there is preferably provided, in addition to the winch, a pulley anchored by its pivot to the free end of the cable, on which pulley winds a flexible element connecting the two free ends of the conductors, and a braking assembly provided with double grooving for receiving and braking the elements of the bundle of conductors coming from different supply spools. In this type of stringing there is however the associated problem of causing the return pulley to pass onto the guide pulleys of the conducting cables, associated with the individual supports of the line, while preventing the conductors from leaving the groove of the pulley, but above all, preventing, during this passage, variations in tension and hence variations in the equilibrium of the entire line. According to the invention also there is therefore provided a pulley which avoids all these disadvantages, ensuring uniform and constant stretching.

In the case of the stringing of two conductors by means of a pair of tensioning cables, a winch for winding the tensioning cables may comprise two pairs of drums operated by a single control through the medium of a differential mechanism.

Figure 4:
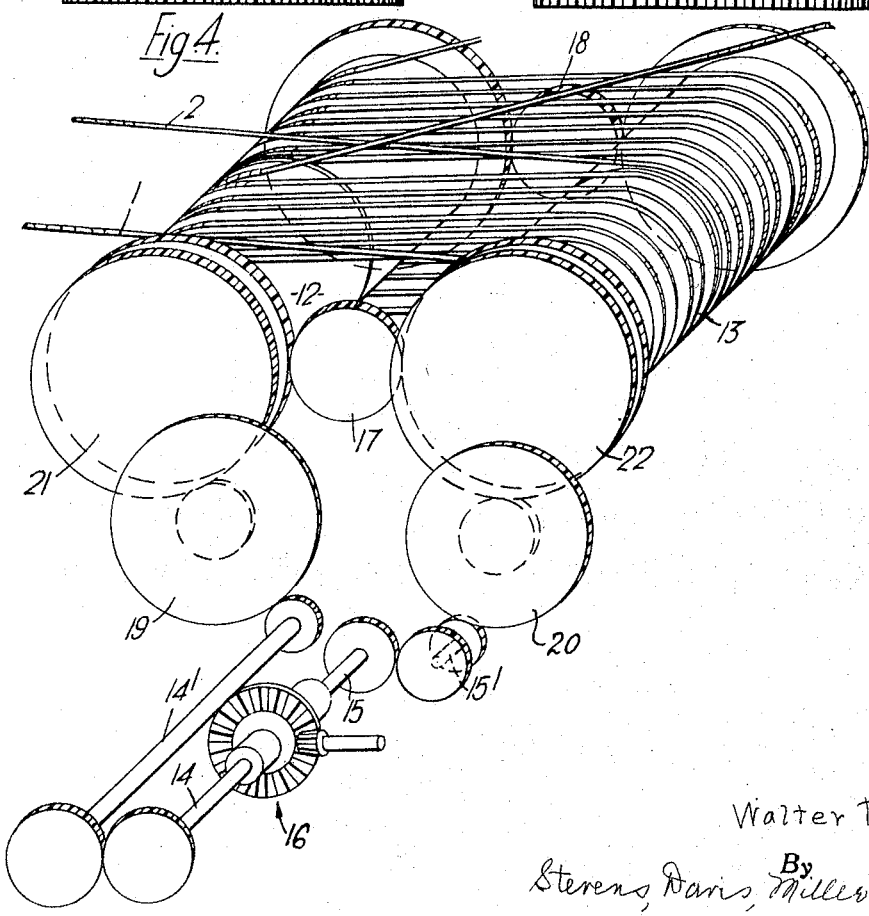

The invention will now be described by way of example with reference to the accompanying drawings, which illustrate the invention solely by way of example and in which:

FIG. 1 is a perspective view of a pair of braking drums onto which two conductors are wound, FIG. 2 is a perspective view of a return pulley for use in stretching a pair of conductors by means of a single tensioning cable, FIG. 3 is a plan view, partly in section, of a pair of winch drums arranged for tensioning a pair of conductors, FIG. 4 is a diagrammatic perspective view of the pair of drums illustrated in FIG. 3, and an associated differential control device, FIG. 5 is a plan view, partly in section, of a pair of winch drums arranged for tensioning a single conductor, FIG. 6 is a diagrammatic perspective view of the pair of drums illustrated in FIG. 5, with an associated control device, FIG. 7, 7a and 8, 8a are force diagrams relating to a conventional guide pulley system, and a guide pulley according to the present invention for stretching a pair of conductors by means of a single tensioning cable, FIG. 9 is a side view of a practical embodiment of the guide pulley system of FIG. 8, FIG. 10 is a front view of the guide pulley system, FIG. 11 illustrates a detail of the anti-running device mounted on the guide pulley system shown in FIGS. 9 and 10, and FIG. 12 shows a modification of the guide pulley system illustrated in FIG. 8.

For the purpose of stringing a twin conductor, a pair of conductors 1 and 2 (FIGS. 1 and 2) are wound on drums 3 and 4 which are provided with double helical grooves. A braking effort is exerted on the drums by means of known devices. The equalization of the tension in the two conductors is effected by means of an element that connects them to the tensioning cable, instead of being obtained by braking means such as have previously been employed.

For this purpose the free ends of the two conductors are interconnected, in accordance with the present invention, use being made of provisional joint means normally employed in mechanical stringing, by means of a loop of cable 5 of adequate length. The loop 5 passes round a return pulley 6, the support 6' of which is fixed to the end of a single tensioning cable 7 (FIG. 2).

The conductors 1 and 2 and the tensioning cable 7 are connected to the return pulley 6 via rotary connections 8, 9 and 10 respectively, in such manner as to prevent the transmission to the return pulley 6 of any torque that may arise in the conductors and the cable 7 during the stretching operation.

The return pulley 6 is also provided with a counterweight 11, the object of which is to lower the center of gravity of the system to such an extent as to maintain it in stable equilibrium. It is clear that with the arrangement illustrated complete equilibrium is automatically established between the tensions in the two conductors 1 and 2, provided the return pulley 6 can rotate freely on its pin 6'.

The use, in the stretching of a pair of conductors, of a return pulley as a means of connecting the tensioning cable to the conductors enables a braking system to be used comprising only two friction drums and a single braking mechanism, all of which is similar to that employed for the stretching of single conductors.

It is however necessary to construct a particular type of guide pulley for use in the stringing of the single elements of a power line, permitting the return pulley to run easily without shocks, and reliably guiding the conductors. Such a guide pulley, which is another object of the present invention, will be described below.

In the braking system shown in FIG. 1 there are provided friction drums with grooves of double helix type, in which the two interconnected conductors are wound. If it is desired to adapt the braking system to the stringing of a single conductor, particularly where this is of large diameter, it is sufficient to mount on the friction drums half-shells of aluminum, which for convenience of mounting are divided into sectors and on which are formed single helix grooves, as described below in connection with the winch drums.

In this manner, it is possible to employ the braking system in both ways, utilizing the whole of the power absorbed by the brake.

The winch that provides the pull and is constructed in accordance with the present invention is illustrated in FIGS. 3 to 6. It enables a pull to be exerted by a single tensioning cable, or by two separate cables in which the tensions are fully and automatically equalized.

As shown in FIGS. 4 and 6, the winch comprises two friction drums 12 and 13 controlled separately by half shafts 14, 14' and 15, 15' respectively of a differential 16.

Each of the two drums is divided into the sections 12, 12' and 13, 13' respectively (FIG. 3), only one section of each drum being solid with the shaft of the drum, the other section being free thereon.

The section fixed on the shaft of one drum may be connected to the free part of the other drum by means of pinions 17 and 18 (see FIG. 3).

When the two pinions 17 and 18 are engaged with the associated toothed wheels, the winch operates with two pairs of friction drums on which may be wound the two tension cables required for effecting the simultaneous stretching of two conductors (see FIG. 4).

The tension in the two conductors will be automatically maintained in full equilibrium by the differential device 16. The two half-shafts 14 and 15 control, via gear wheels 19 and 20 respectively, toothed wheels 21 and 22 solid with the shafts of the drums 12 and 13. On the shafts are keyed the two sections 12' and 13 respectively, and the action of the differential is such as to maintain exactly equal the two driving torques applied to the sections 12, 13 and 12', 13' respectively of the friction drums.

In the event of it being desired to make full use of the winch for operation with a single tension cable, the arrangement illustrated in FIGS. 5 and 6 is used. The sections 12 and 12' of one drum and the sections 13 and 13' of the other drum are covered with shells or cylindrical sectors 23 and 24 respectively, having larger single helix grooves. The object of these shells is to provide full anchoring of the tension cables, but above all to connect one section of a drum rigidly to the other section of the same drum. The pinions 17 and 18 are removed, so that the two drums constitute two rigid systems connected only via the differential device. The half-shafts 14 and 15 of the differential device are again connected to the two sections 12' and 13, respectively, but in this case the function of the differential device is different, being to equalize the tractive efforts applied to the two drums 12 and 13, arising from the effect of the non-uniform distribution of the tensions in the conductors that wind in successive spirals on the two drums, this effect being more noticeable in the case of conductors of large diameter subjected to appreciable tension.

It is evident that by employing a winch arranged as described for the simultaneous stretching of two tension cables (see FIG. 4) two return pulleys and a braking system with two drums having quadruple helix grooves, it is possible to effect the simultaneous stretching of four conductors.

The guide pulley system illustrated in FIGS. 9 and 10 is intended to be used, as stated, in the stringing of pairs of conductors by means of a single tension cable, and is particularly suitable for permitting easy running of the return pulley 6. It comprises, in a frame 29, two pulleys 30 of large diameter with wide peripheral grooves 31 for the conductors to be stretched, between which is located a pulley 32 of much smaller diameter for the tension cable. The pulley 32 is arranged advanced, in the direction of tension of the cables relative to the principal axis 33 of the frame 29, and is preferably made of cast iron, whereas the pulleys 30 are made of aluminum, the latter having spokes 30' solid with the hub 30''. The form of the pulleys 30 and of the frame 29 is clearly illustrated in FIGS. 9 and 10, but for guide pulleys of large dimensions the system is preferably of the form illustrated in FIG. 12, which permits rapid dismantling of the guide pulley into its various parts, which is of great utility for transport purposes, and conversely rapid assembly together of the various parts.

The supporting frame 29 is mounted so as to swing on a suspension fork 26 adapted to be fixed to brackets on the pylons or the like of an electrical power line system. The advantages of an arrangement such as illustrated are made clearly evident by the diagram in FIGS. 7 to 8a. In FIG. 7 is shown the behavior of a conventional guide pulley upon the passage thereover of the return pulley 6 or other element connecting the tensioning cables to the cable to be stretched, whilst FIG. 7a is a diagram of the forces in action in this case and provides in addition to the value of the increment in tension ΔT, equal to the scalar differences between the exit tension $T_u$ of the tensioning cable and the entry tension $T_e$ of the cable, the value of the resultant forces R acting on the pulley, equal to the vectorial differences between $T_u$ and $T_e$. Conversely, FIG. 8 illustrates the behavior of a guide pulley according to the invention under the same conditions as the conventional guide pulley of FIG. 7, the diagram of forces acting ($T_e$, $T'_u$, Δ'T, R') in this case being illustrated in FIG. 8a.

The efficiency of the guide pulley according to the invention will be clear from a comparison of FIGS. 8 and 8a with FIGS. 7 and 7a. The guide pulley according to the invention, acted on by a force R' which is smaller than and less inclined to the vertical than R, maintains itself in a more correct position upon passage of the return pulley 6 onto the pulley 30 in the sense that its principal axis 8 remains substantially closer to its normal vertical position V of suspension and the increment Δ'T in the tension, upon passage of the return pulley, is appreciably reduced relative to the one ΔT that occurs with the conventional guide pulley.

The guide pulley according to the invention is completed by anti-running devices for the pulley of the tensioning cable and by a device that serves to maintain it in alignment with the tensioning cable during the stringing operation.

In the embodiments shown in FIGS. 9 to 12, the anti-running devices are in the form of a metallic arcuate member 25 (see also FIG. 11) carried by the arm 27 of the sleeve 28, which can swing around the upper traverse 29' of the frame 29. In the rest position, at the commencement of stringing, the member 25 of the device is lowered and constitutes a semi-annular lip for the pulley 32, which prevents the running of the tensioning cable from the pulley.

When, in the course of stretching the conductor the return pulley meets the guide pulley, the rings 25 are raised, and remain in this position for the whole of the remaining part of the operation, during which they are not required to serve any purpose. FIG. 11 shows a system for locking the sleeve 28 and hence the ring 25 in the lowered position to prevent accidental raising thereof. A ball 34, acted on by a spring 35, engages a seat 36 in the sleeve 28.

Finally, the device for maintaining the guide pulley in alignment with the tensioning cable is constructed in simple manner by the provision of a fourth pulley 37 of slightly less diameter than of the pulley 32, freely mounted on the frame 29 behind and in the same plane as the pulley 32, with its periphery at the same level as the periphery of the pulley 30. The tensioning cable bears on the pulley 37 and over a wide arc of the pulley 32 and tends to maintain the guide pulley in alignment with itself.

What is claimed is:

1. Equipment for mechanically stringing simultaneously the conductors of a bundle, comprising a pair of winches, each winch being provided with a pair of drums, a toothed wheel associated to each drum, and at least one gear joining the said toothed wheels, two pulling ropes each wound by a first end of the pair of drums of each winch and connected by its second end to at least one of the conductors of the bundle, and a differential device joining said two winches through said gears and adapted to equalize the tension on the two pulling ropes.

2. Equipment as claimed in claim 1 wherein said pair of winches comprises two shafts, a first drum of the first winch keyed on the first shaft and a second drum of the second winch keyed on the second shaft, a first drum of the second winch and a second drum of the first winch being freely mounted for rotation about the first shaft and the second shaft respectively.

3. Equipment as claimed in claim 2 wherein means are provided for making all the drums integral with their axes, and for disengaging said gears from the respective toothed wheels associated to the drums, said two coupled winches thus forming a single winch for a single pulling rope.

4. Equipment as claimed in claim 3 further including a return pulley the axis of which is anchored to said second end of a pulling rope and a cable loop sliding in the race of said pulley the ends of said loop being anchored to the ends of a pair of conductors of the bundle, said pulley being adapted to freely rotate about its axis to equalize the tension on said pair of conductors.

5. Equipment as claimed in claim 4 comprising rotary joint means for connecting the ends of said cable loop to the ends of the conductors of said pair of conductors, said joint means permitting a free rotation of the conductors about their own axes.

6. Equipment as claimed in claim 1 further comprising a braking unit consisting of a pair of drums, a toothed wheel mounted on each drum and at least one gear joining said toothed wheels, a braking device controlling the rotation of said gear, the surface of each drum having a series of grooves in the form of parallel spiral turns for driving the conductors of the bundles, one groove being provided for each conductor.

7. Equipment according to claim 1 in which a guide pulley system is provided for use in stretching multiple conductors, comprising two pulleys of large diameter and wide throat for the conductor to be stretched and supported by a frame adapted to be suspended from pylons and the like, and at least one pulley of appreciably smaller diameter and throat for the tensioning cable, the axle of which is carried by said frame advanced in the direction of pull, relative to the axis of the pulleys of large diameter.

8. Equipment according to claim 7 in which said pulley for the tensioning cable is disposed between the two lateral pulleys for the conductor to be stretched and is provided with anti-running devices.

9. Equipment according to claim 8 in which said anti-running devices are constituted by arcuate metallic members forming a rim for the pulley of the tensioning cable, adapted to rise upon passage onto the guide pulley of the return element interconnecting the conductors and the tensioning cable and to remain in an elevated position during the passage of the conductors.

10. Equipment according to claim 7, comprising also at least one device for maintaining the guide pulley in alignment with the tensioning cable.

11. Equipment according to claim 10 in which said device for maintaining said guide pulley comprises at least one grooved wheel freely mounted on the support of the guide pulley, in the same plane and behind the pulley for the tensioning cable, the periphery of which is at the same level as that of the pulley for the conductors to be stretched.

References Cited by the Examiner

UNITED STATES PATENTS

| 2,948,483 | 8/1960 | Peterson | 254—134.3 X |
| 3,121,557 | 2/1964 | Turner | 254—134.3 |

FOREIGN PATENTS

| 1,322,462 | 2/1963 | France. |
| 868,968 | 5/1961 | Great Britain. |

WILLIAM FELDMAN, *Primary Examiner.*

OTHELL M. SIMPSON, *Examiner.*